United States Patent [19]

Lee

[11] Patent Number: 5,604,791
[45] Date of Patent: Feb. 18, 1997

[54] SINGLE LINE TELEPHONE ANSWERING SYSTEM WITH ACCESS SECURITY FEATURES

[76] Inventor: Shonh S. Lee, 267 Pulido Rd., Danville, Calif. 94526

[21] Appl. No.: 390,278

[22] Filed: Feb. 15, 1995

Related U.S. Application Data

[63] Continuation of Ser. No. 135,733, Oct. 13, 1993, abandoned.
[51] Int. Cl.$^6$ ............................. H04M 1/64; H04M 1/57; H04M 1/72
[52] U.S. Cl. .......................... 379/67; 379/142; 379/199; 379/217; 379/375
[58] Field of Search .................. 379/67, 69, 70, 379/74, 77, 79, 81, 82, 88, 102, 128, 142, 156, 159, 160, 161, 164, 167, 168, 170, 171, 172, 173, 177, 179, 182, 183, 184, 187, 210, 211, 212, 213, 214, 217, 249, 355, 373, 374, 375, 418, 57, 58, 62, 199

[56] References Cited

U.S. PATENT DOCUMENTS

| 3,654,396 | 4/1972 | Biezeveld | 379/199 |
|---|---|---|---|
| 3,936,617 | 2/1976 | Bolgiano | 379/199 |
| 4,006,316 | 2/1977 | Bolgiano | 379/104 |
| 4,266,098 | 5/1981 | Novak | 379/77 |
| 4,387,272 | 6/1983 | Castro et al. | 379/77 |
| 4,393,278 | 7/1983 | Miyoshi | 379/199 |
| 4,393,335 | 1/1990 | Fuller et al. | 379/212 |
| 4,446,334 | 5/1984 | Groff | 379/188 |
| 4,546,213 | 10/1985 | Dick | 379/95 |
| 4,578,540 | 3/1986 | Borg et al. | 379/199 |
| 4,591,664 | 5/1986 | Freeman | 379/373 |
| 4,596,900 | 6/1986 | Jackson | 379/105 |
| 4,639,552 | 1/1987 | Hall | 379/199 |
| 4,656,657 | 4/1987 | Hunsicker | 379/131 |
| 4,674,115 | 6/1987 | Kaleita et al. | 379/201 |
| 4,712,230 | 12/1987 | Rice et al. | 379/112 |
| 4,769,837 | 9/1988 | McCormick et al. | 379/160 |
| 4,802,202 | 1/1989 | Takahashi et al. | 379/67 |
| 4,821,319 | 4/1989 | Middleton et al. | 379/167 |
| 4,845,743 | 7/1989 | Lutz | 379/199 |
| 4,850,013 | 7/1989 | Rose | 379/199 |
| 4,860,347 | 8/1989 | Costello | 379/199 |

(List continued on next page.)

FOREIGN PATENT DOCUMENTS

| 61-287361 | 12/1986 | Japan | 379/375 |
|---|---|---|---|
| 04357747 | 12/1992 | Japan | 379/375 |

OTHER PUBLICATIONS

"Dialing for Dollars", Washington Business, The Washington Post, Jan. 15, 1990, p. 3.
Winter 1993, "Hello Direct—Catalog of Telephone Productivity Tools", p. 42, advertisement for call identifiers.
1993 Midyear Edition "AT&T Sourcebook", pp. 100 & 107.

Primary Examiner—Thomas W. Brown
Assistant Examiner—Scott L. Weaver
Attorney, Agent, or Firm—Blakely, Sokoloff, Taylor & Zafman

[57] ABSTRACT

A versatile phone system, consisting of a base unit and one or more peripheral utility devices, is used on the user's premises to provide an effective and private means of telecommunication. A plurality of telephone numbers and names are stored in the memory means of the base unit. The system responds to the ringing signals transmitted over the phone line from the caller without triggering ringer generators at the telephone sets. Alerting ringing sounds to alert the user of an incoming call will be generated only when the derived code of the received DTMF signals matches the derived identifier codes of the stored telephone numbers or the personal access code. Distinct ringing sounds will be generated if a match is on a derived identifier code of a telephone number indexed with priority. When no match occurs or a match occurs but the user does not answer after a predetermined number of rings, the caller is directed to a recording means for requesting to leave message.

27 Claims, 12 Drawing Sheets

U.S. PATENT DOCUMENTS

| | | | |
|---|---|---|---|
| 4,893,335 | 1/1990 | Parnello | 379/157 |
| 4,924,496 | 5/1990 | Figa et al. | 379/142 |
| 4,926,470 | 5/1990 | Sanford | 379/199 |
| 4,937,854 | 6/1990 | Sarakas | 379/199 |
| 4,942,598 | 7/1990 | Davis | 379/211 |
| 5,022,069 | 6/1991 | Chen | 379/67 |
| 5,027,391 | 6/1991 | O'Neill et al. | 379/373 |
| 5,033,080 | 7/1991 | Deane | 379/170 |
| 5,127,049 | 6/1992 | Sabo | 379/199 |
| 5,157,712 | 10/1992 | Wallen, Jr. | 379/94 |
| 5,228,075 | 7/1993 | La et al. | 379/67 |

| KEYS | CHARACTERS | | | |
|---|---|---|---|---|
| | 1 TIME | 2 TIMES | 3 TIMES | 4 TIMES |
| 1 | | | | |
| ABC 2 | A | B | C | |
| DEF 3 | D | E | F | |
| GHI 4 | G | H | I | |
| JKL 5 | J | K | L | |
| MNO 6 | M | N | O | |
| PRS 7 | P | Q | R | S |
| TUV 8 | T | U | V | |
| WXY 9 | W | X | Y | Z |

*Figure 9*

| |
|---|
| 1ST NAME AND TELEPHONE NUMBER |
| 2ND NAME AND TELEPHONE NUMBER |
| 3RD NAME AND TELEPHONE NUMBER |
| ⋮ |
| LAST NUMBER DIALED |
| INCOMING CALL REGISTER |
| STATION I.D. CODE |
| REMOTE CONTROL ACCESS CODE |
| PERSONAL ACCESS CODE |
| PAGER, CELLULAR PHONE, OR DESIGNATED TELEPHONE NUMBER |

*Figure 11*

SINGLE LINE TELEPHONE ANSWERING SYSTEM WITH ACCESS SECURITY FEATURES

This is a continuation of application Ser. No. 08/135,733, filed Oct. 13, 1993, now abandoned.

BACKGROUND OF THE INVENTION

1. Field of the Invention

The present invention relates generally to a telecommunication system. In particular, this system provides versatile operating functions to a telephone subscriber by (1) storing a plurality of names and telephone numbers inside the present invention as his/her telephone directory, (2) transferring incoming phone calls to the user's designated telephone, pager and cellular phone, (3) screening undesired calls to preserve his/her privacy, (4) recording incoming call numbers and messages through a voice digitalization process, (5) providing features which are available in current telephone sets such as "Hold", "Mute", "Flash", etc. and (6) integrating the user's telephone sets on his/her premises to become a Page/Intercom system.

2. Background of the Invention

Telephones have become a primary form of communication today. As technology progresses, new telecommunication devices are being developed and commercialized so quickly, making an enormous impact to our daily lives. For example, pagers and cellular phones have made communications so much more effective that demand for such devices are expected to increase drastically over the next several years. In addition, information technology is prevailing in our current society where an individual's personal information is easily accessible to the public. Although some laws have been instituted to protect an individual's privacy in certain areas, there still persists a deluge of unwanted and unexpected phone calls, junk mail, etc.

There are three important aspects regarding telephone systems which are frequently a concern of most telephone subscribers. First, that one can be reached even when he is not near a telephone by transferring an incoming call to his pager, cellular phone, or a designated telephone. Second, that privacy is preserved by screening and not answering unwanted calls. Third, that one is not bothered by phone rings from unwanted or wrong number calls, particularly in the evening.

There are a number of ways to at least partially eliminate unwanted calls. Many schemes have been proposed. One way is to remain unlisted in the telephone directory. Despite this precaution, the number may be conveyed through purchase and trade within the telemarketing industry. Therefore, an unlisted phone number is not a fool-proof means for protecting privacy. However, it should be realized that an unlisted number also poses an exclusionary communication barrier; those who are genuinely interested in communicating with someone who has an unlisted telephone number are unable to.

Often, people employ an automatic telephone answering machine to avoid unwanted phone calls. The drawback of using this instrument is that the user is still constantly bothered by a ringing telephone every time there is an incoming call. In addition, the user must be in the general vicinity of the answering machine to listen to the voice and to decide if the phone call is someone to whom he would like to speak. Moreover, the user must turn off the answering machine before he can talk to the person on the line. This can sometimes be a very awkward and/or annoying situation to both the user and caller.

A recent innovation presently being offered by regional telephone companies, such as Pacific Bell, is the "Caller I.D." feature. The "Caller I.D." service is provided by the telephone company for a monthly service charge. When a caller calls a user having this service, the telephone company will transfer the caller's information, such as a telephone number, to the subscriber. A special device is required by the user for displaying the caller's phone number. Usually, this service will send the caller's phone number between the first and second ring. To distinguish desired calls, the subscriber must have good memory skills to know which calls he wants to answer. Essentially, to maximize the benefits of such a system, a subscriber must be able to immediately identify a caller solely by the displayed phone number.

In addition, some of the same disadvantages of having an answering machine arise in the "Caller I.D." system. First, this service has the same disruptive quality; the telephone rings with every incoming call. Second, in order to screen calls, the "Caller I.D." system requires the subscriber to be within the general vicinity of the display unit. In addition, the "Caller I.D." service has been challenged by the various regional Public Utility Commissions for possibly invading the caller's individual privacy. Finally, the cost of the display devices is not insignificant; a user will typically purchase multiple devices which retail currently between $75.00 and $200.00 per device.

It has also been suggested that a security code feature be used to screen incoming phone calls. These proposed security codes have employed the following techniques: multiple digits, combinations of symbol and number, or the caller's telephone number. The security codes are intended to prevent easy access by unwanted callers by passing through only those callers which provide the authorized code. Prior inventions for security code units always include a memory circuit (mechanical or microprocessor) and a comparing circuit. A preset security code is stored in the memory circuit. In the process of receiving an incoming phone call, the caller must enter the security code. The input information is then compared with the preset security code stored in the memory circuit. If a match is found, a ringing signal generated by a second ringer generator is transmitted to a loudspeaker on the user's premises. If there is no match or no input from the caller during a predetermined period of time, the caller is directed to an answering machine or the call is disconnected.

There are many disadvantages associated with these screening devices. First, some of these systems do not announce any instructions to the caller. The caller does not know how to respond to these systems. Second, callers often have a preset time limit in which to input the necessary security codes. Typically, the time limit expires and the system defaults by disconnecting the call. Third, a telephone answering machine is often used in many of these prior art screening devices for announcing the operating messages. This obviously requires a special kind of answering machine and interface. A system with a built-in memory circuit to announce only the instruction message is neither equipped to handle the input information properly nor able to preserve the information from incoming calls for the user to review at a later time. This may result in the user missing a desired or important phone call.

In addition, these screening systems use a preset security code which is impractical for callers who must somehow remember the receiving party's code. If many of these systems exist, a caller would be burdened with the awesome task of retaining the codes. This is impractical for a typical consumer and makes this type of a screening system both user unfriendly and commercially unmarketable.

If such a screening device were to use a plurality of telephone numbers stored in a memory circuit to identify access codes, this also has a number of drawbacks. The user must input many telephone numbers into its internal memory, increasing the margin of error for inputting an incorrect number, particularly due to the lack of any feedback mechanism. The device also does not provide a simple means for the user to easily access the device externally. In addition, such devices typically utilize the auto dialing memory to store the identifying telephone numbers. This limits the number of telephone numbers that can be stored and requires a loudspeaker to alert the user of incoming calls.

Furthermore, most prior screening devices are connected to the phone line at one location in the user's residence. However, most residences or businesses have multiple device connections to a single telephone line. When screening devices are connected in parallel to the phone line with other extension telephone, each of the extension telephone will emit a telephone ringing sound before the screening devices respond to the incoming call. To rectify this problem, the user must manually deactivate the ringing mechanism in the other connected phone sets. Consequently, the user cannot hear the phone ring while away from the screening device because the other telephone sets have been silenced. It has been suggested to connect the screening device in a serial manner with or in front of other connected telephone sets and transmit a high AC ringing voltage (similar to the ringing voltage transmitted from the telephone company's central office (CO) line) to trigger the ringing mechanism located in the attached telephone sets. However, this is quite cumbersome as the tasks of locating the closest physical point on the user's premises to the outside phone line and connecting the screening device serially to the phone line is quite difficult.

Another alternative that has also been proposed requires the installation of an electrical loudspeaker system within the user's premises. The cost of installing such loudspeaker system and the transmission of the ringing signals, as well as the annoying sound level of this loudspeaker system, makes the system unfavorable in use.

It has also been suggested that the screening devices provide a way to use the telephones in the home as an intercom system. This intercom system simply triggers the other connected telephone sets by generating a high voltage ringing signal similar to the signal generated on the CO line. This signal causes the connected telephone sets to emit an alerting ringing sound when the high voltage ringing signal is received. In order for this system to work, the proposed device to control the intercom must be connected serially in front of the other connected telephone sets. In addition, the device has to be electrically isolated temporarily somehow from the CO line to avoid damaging the switching board at the telephone company's terminal station when a high voltage ringing signal is transmitted by the device to generate an alert at the other telephone sets. Moreover, the device cannot specifically page a designated telephone set, but rather issues the page to all connected telephone sets.

SUMMARY OF THE INVENTION

The telecommunications system of the present invention has been designed with a view of greatly eliminating the problems and difficulties inherent in the prior related telecommunication devices. Its principle objectives include the provisions: (1) a telephone directory for storing a plurality of telephone numbers, (2) an automated call screening system for rejecting undesired calls as well as maintaining privacy for the users, (3) a telephone transfer means for automatically transferring the caller's telephone number or an alerting message to the user's designated telephone number, pager, and cellular phone when a caller tries to reach the user, (4) a voice digitalization recording means for recording the caller's telephone number and message, (5) an integrated internal page/intercom system for the user's telephone system, and (6) a telephone system with multiple functional features.

The convenience and accessibility of pagers and cellular phones requires the distribution of the pager and cellular phone number to callers. Also, the need to either remember multiple numbers (i.e., pager and cellular phone number) or know how to process these number through the user's phone system can become annoying and/or impractical. One objective of the present invention is to provide a practical and convenient way for callers to reach the owner of a pager or cellular phone by simply dialing the user's regular office or home telephone number and leaving the caller's telephone number without having to memorize the pager and cellular phone number as well as know how to process these numbers. The present invention will be able to alert the user that someone has attempted to contact the user by automatically dialing his pager or cellular phone after the caller leaves a telephone number and message.

To maximize privacy, the present invention screens calls for the telephone subscriber by requesting the caller to input the caller's telephone number in accordance with a user friendly interface and comparing a code derived from the caller's telephone number with an identifier code derived from the stored telephone numbers. If a match is found, telephone-like ringing sounds will then be emitted to alert the user that there is a desired call. Conversely, the caller will be requested to leave a phone number and message. Thus, messages are recorded and unwanted, unexpected or wrong number calls are screened. The user then decides upon the calls to return by reviewing the recorded messages. This provides the user with the knowledge of the callers whom have been trying to reach the user. Important phone calls will not be missed and wrong number calls, salesmen calls, obscene calls, and other nuisance calls will be avoided. Furthermore, disruptive noise of a ringing telephone will not disturb the user's evenings or important moments, such as meal times, meetings, social activities, etc.

The telecommunications system of the present invention consists of a base unit connected in parallel to the telephone line with one or more peripheral utility devices. Each peripheral utility device is preferably coupled to a telephone set. The base unit comprises a memory means for storing a plurality of telephone numbers to be used as a telephone directory. These telephone numbers identify those callers the user has authorized access to; that is, the callers the user wishes to speak to. The memory also stores incoming telephone number signals from the caller received by the DTMF receiving circuit to be recorded in an incoming telephone number register, predetermined codes to be used as personal access code and remote control access codes, the user's designated transfer numbers to be the designated telephone number, pager number, and/or cellular phone number, and preset codes to be as designated signal codes for selected operating functions. The base unit also includes at least one processor unit to implement the functions of the system, for example, inputting and editing of data for creating the telephone directory, comparing the identification of the incoming telephone signals (e.g. any string length of the caller's telephone number) received by the DTMF receiving circuit over the phone line from the caller to match a derived identifier code from one of the telephone numbers in the telephone directory or the personal access code and generating a ringback signal to be transmitted over the phone line to the caller and the other phone sets on the user's premises, performing selective system operating functions, and automatically dialing for various dialing features and call transfer.

The user can enter the authorized telephone numbers and names into the telephone directory residing in the memory means. The user then is able to search the telephone number according to the list of names contained in the telephone directory. In addition, the user can easily edit the telephone number through a sequence of manipulations by following a menu driven program. Furthermore, when the name and telephone number the user is searching for are shown on the LCD display panel, the user can simply press the "Display Dial" to place a call to this designated number.

The automatic dial process of the base unit is used to implement the operating features which require automatically dialing, such as "Repeat Dial", "Speed Dial", "Display Dial", etc. Particularly, the "Call Transfer" feature utilizes the automatic dial process to transfer the incoming calls to the user wherever the user is located. Initially, the user enters the pager number, cellular phone number, or a designated transferring phone number into the memory of the base unit. When an incoming call is received, the base unit automatically dials one of these numbers to transmit the user's (or caller's) telephone number or send an alerting message indicating that there is a recorded message in the voice memory means of the base unit. For example, the user's (or caller's) number will appear on the user's pager if a page transfer is so elected by the user. The user may call his/her telephone to review the message or call the caller at the number appeared on the pager. On the other hand, if an alerting message is received by the user's cellular phone or a designated telephone, the user manipulates a sequence of remote control codes to review the recorded messages and telephone numbers. Upon reviewing the messages, the user can decide whether to return the call.

The base unit also includes a low voltage driven ringer generator which triggers a speaker to emit a ringing sound to alert the user when the derived code of the received DTMF signals matches the derived identifier code of one of the telephone numbers in the telephone directory. If the derived code matches an identifier code indexed with priority, a distinct ringing sound will be emitted to indicate a prioritized call.

Furthermore, the base unit also includes a message memory component which is composed of logic for recording and announcing the outgoing messages, personal messages, and alerting messages, and further for recording, reviewing, and erasing the messages left from the caller in a fully digitized manner, a voice memory for storing the aforementioned voice information and a voice synthesizer to generate audio sounds on the retrieved information from the voice memory chip.

In addition, an LCD driver and display panel are incorporated into the base unit for purposes of displaying the following information: (1) names and telephone numbers of the telephone directory as they are entered, retrieved, and edited, (2) incoming telephone number signals, (3) operational status of the telephone, (4) time and date.

In accordance with one embodiment of the present invention, the base unit is connected to any one of the existing phone sets on the user's premises as a base station. The base unit answers an incoming ringing signal and responds to the incoming call with an announcing message instructing the caller to enter the caller's telephone number. Upon receiving the DTMF signals from the caller identifying the caller's telephone number, a comparison of the caller's telephone number and authorized telephone numbers is performed. For example, a ringing sound is emitted only when the receiving DTMF signals matches with the derived identifier code from one of the telephone numbers stored in the telephone directory. If the identifier code indexed with a priority designation is matched, a distinct ringing sound is generated to indicate a priority call. If no match occurs, the base unit releases the second outgoing message to request the caller to leave a message. The caller's message is then digitized and stored in the voice memory chip. If a match is found and the phone is not answered after a predetermined number of ringback signals have been transmitted, the base unit will respond in a similar manner as in the case of no match; the caller will be requested to leave a message.

The base unit provides an easy operational procedure for the user to review or erase the recorded messages from his/her telephone set or a remote phone set through preset remote control codes. The base unit also includes many other operating features, such as "Hold", "Flash", "Mute", "Repeat Dial", "Memory Dial", "Display Dial", "Call Transfer", "Intercom", "Privacy", etc.

In addition, the base unit also provides a personal access code. The user or designated persons can use the personal access code to access the phone system. The base unit is also designed to alert the user through a designated telephone, pager or cellular phone when the user is away from the vicinity of the base station and there is an incoming call (particularly, a priority call). The user can choose how often the base unit will transfer the incoming calls. For example, a transfer can be made after every call, or after receiving a predetermined number of calls, or only for a priority call. Therefore, the user can be reached when away from the base unit.

To further enhance the system, there is a timing control means which allows the user to only accept priority calls during a selected period, such as between 10 PM to 6 AM so that the user is not disturbed late at night by unauthorized or non-priority authorized calls.

In another embodiment, the base unit is integrated with a telephone control circuit to become a fully operable stand alone telephone set. The base unit in this embodiment includes a handset which can be directly connected to any one of the phone jacks on the user's premises.

A peripheral utility device and an extension phone are connected to the telephone line to facilitate use of the system. A device control switch is used to control the operating status of the peripheral utility device and therefore the extension phone set. A DTMF receiving circuit and code signal verifier are employed to distinguish the code signals transmitted over the phone line from the calling party and a ringback signal from the base unit after the incoming call is verified as a desired call. The peripheral utility device does not respond to the first ringing signal transmitted over the phone line from the caller, but generates ringing sounds when low voltage ringback signals are transmitted from the base unit. Therefore, the user is no longer bothered by undesired calls and will only be alerted if there is a desired call or a priority call.

A processor is preferably included to provide additional functionality. Operating functions such as "Hold", "Mute", "Flash", "Silence", "Page/Intercom",, "Privacy", "Repeat Dial", "Speed Dial", etc. are provided by the processor.

The telecommunications system of the present invention can also be used as an internal intercom system utilizing both the base unit and the peripheral utility device. For example, if the user presses the "Page/Intercom" button of the feature selectors, followed by the station I.D. at any of the phone sets on the user's premises, only the paged station will emit ringing sounds. Furthermore, if the user presses the "Privacy" button of the feature selectors, all the phone sets except those phone sets already off-hook will be disconnected from the phone line.

Further applicabilities and benefits of the present invention will become apparent from the detailed discussion presented hereinafter. However, the specific examples of the following preferred embodiments are described and illustrated in detail for presentation only. Various modifications within the spirit and scope of the present invention will become apparent to those skilled in the telecommunications art from this following detailed description.

BRIEF DESCRIPTION OF THE DRAWINGS

These and other objectives and features of the present invention will become apparent and clear from the following description taken in conjunction with the preferred embodiments thereof with reference to the accompanying drawings, in which:

FIG. 9 is a table that sets forth an exemplary characters input scheme.

FIG. 11 illustrates a layout of memory of recorded information in the memory means.

DETAILED DESCRIPTION OF THE INVENTION

Figure 1:
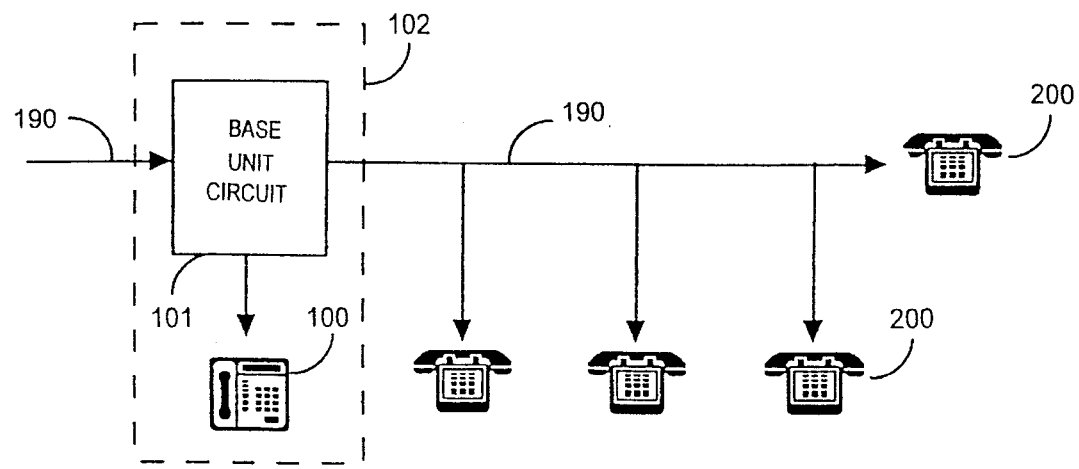
FIG. 1 illustrates one embodiment of the present invention in which the base unit is connected serially to the telephone sets.

In one embodiment, the present invention includes a base unit and one or more peripheral utility devices (PUDs) coupled between the telephone sets and the telephone line, to provide a sophisticated full featured in-home system across a single telephone line. The system utilizes microprocessors to perform sophisticated operating, recording and reviewing functions of voice messages, remote control and screening operations. A telephone directory which is able to store up to hundreds of telephone numbers is created. An identifier or code is associated with each stored telephone number. A priority list of the telephone numbers which are associated with the stored telephone numbers are the designated numbers to be used as identifier codes during the user's predetermined priority calling period. In addition, distinct ringing sounds to alert the user are generated by calls from callers located on the priority list. The outgoing messages and the recorded messages left by the callers are fully digitized. The digitizing of voice messages give the system of the present invention rapid random digital access to any messages left on the voice memory chip for reviewing or erasing. The inputs of incoming telephone numbers entered by the caller are also voice digitized and stored in front of each message left by the caller on the voice memory chip for further assurance of retaining the caller's telephone number. These digitized incoming telephone numbers can be retrieved for the call transferring feature described herein.

The present invention also provides a peripheral utility device which is connected between an extension telephone and the telephone line. The peripheral utility device triggers the ringing signals only when an incoming call is determined to be authorized. Other functions of the peripheral utility device are to be discussed hereinafter.

The present invention further provides other security codes, including a personal access code and a remote control access code. These codes make the present invention even more effective and flexible. Particularly, the user and persons designated by the user can use the personal access code to gain access to the telephone system without being locked out. The terminal control codes can be used to remotely access and control the system and electronic devices connected to PUDs, such as lights and televisions. Furthermore, the present invention provides a power off safety guard leaving the telephone still operational if the power is off.

The present invention still further integrates the user's telephone system to become an integrated intercom system. The user is able to use one of the telephone sets to page any other phone set connected to the system. Furthermore, the user can also deactivate the other phone sets of the telephone system to keep the conversation private by disconnecting the other phone sets from the phone line. Once a on-hook signal or an activate signal has been received, all phone sets are returned to normal operating mode to be either ready for receiving incoming calls or placing an outgoing call, or participating in the ongoing phone conversation.

FIGS. 1 to 4 illustrate exemplary configurations of the versatile telephone system of the present invention. The base unit 101 is illustrated in FIGS. 1 to 4, is connected either in a serial or parallel manner to the user's telephone line. It should be noted that it is not necessary for the base unit 101 to be connected at the location on the telephone line nearest to the outside phone line at the user's premises. The base unit of the present invention can be connected to the telephone line at any location within the user's premises.

The user can use the base unit to store a plurality of telephone numbers which may be used as a telephone directory for retrieving the calling party's phone number. Furthermore, when telephone calls are transmitted over the phone line, the base unit responds to the calls and automatically performs the call screening process for the user. In addition, if the user is not on the premises, the base unit can be enabled to automatically contact the user, by connecting to a designated telephone, cellular telephone or pager, to alert the user of messages that have been left in the user's absence. Still further, the base unit provides additional operating features in a flexible and economical manner to the user, providing state of the art telecommunication technology.

Figure 2:
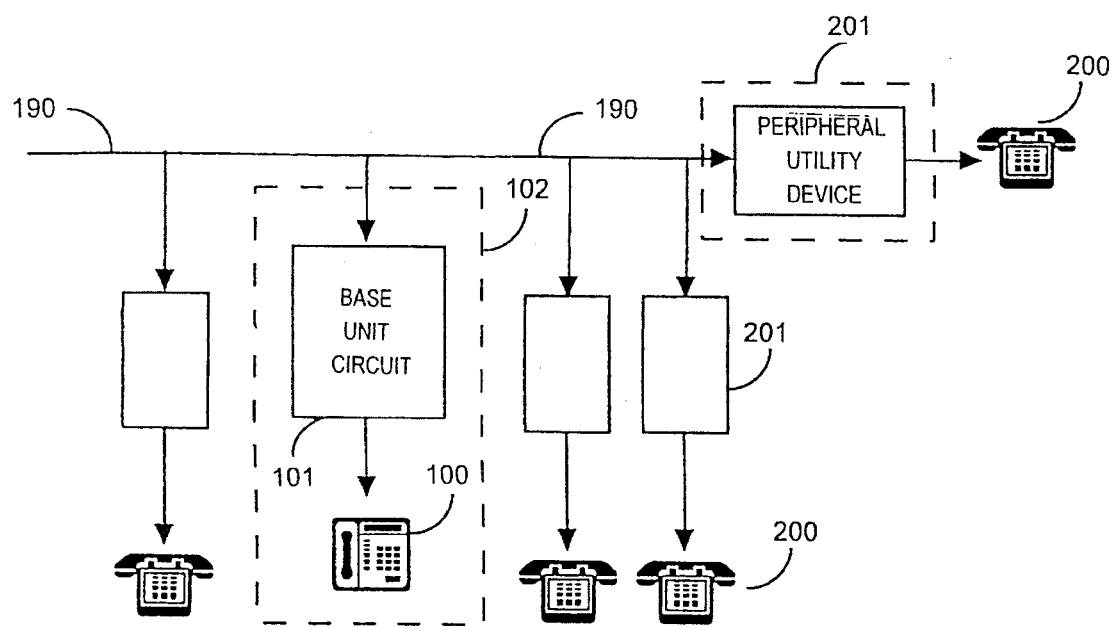
FIG. 2 illustrates the system of the present invention in which the base unit is connected in parallel with the telephone sets and peripheral utility devices.
Figure 4:
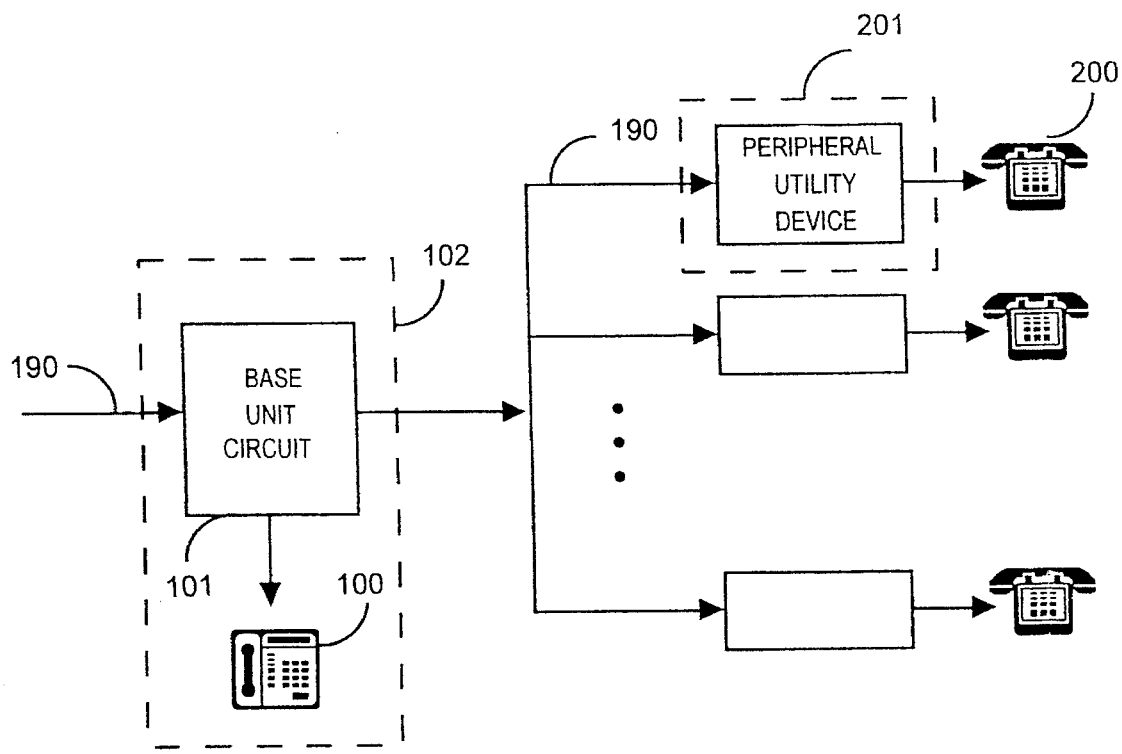
FIG. 4 illustrates an alternate embodiment in which the base unit is connected between the central office line and the peripheral utility devices and telephone sets.

Although the system is not limited as such, the system preferably includes a peripheral utility device (PUD) which is connected between telephone sets, such as extension telephone sets and the telephone line. The embodiments illustrated by FIGS. 2 and 4 show a peripheral utility device 201, connected between the telephone line and each extension telephone 200. The PUDs 201 connected to the extension telephone 200 function to silence the first ringing signal transmitted over the phone line 190 from the caller and to emit ringing sounds once ringback signals (low voltage ringing signals) are generated by the base unit 101 or 102 when a desired call is verified access. Thus, there is no requirement to serially connect the base unit at the first incoming point of the telephone line in an attempt to prevent the telephone sets from ringing at every incoming call. Further, the user is not annoyed by the first ringing sound from every incoming phone call while being alerted at any place inside the premises when there is a desired call. In addition, the low voltage ringing signal does not interfere with the high voltage signals issued by the telephone company across the telephone line. Therefore, the same telephone line may be used on the user's premises. Other advantages of using the peripheral utility devices in conjunction with the base unit will be described in detail hereinafter.

Figure 5:
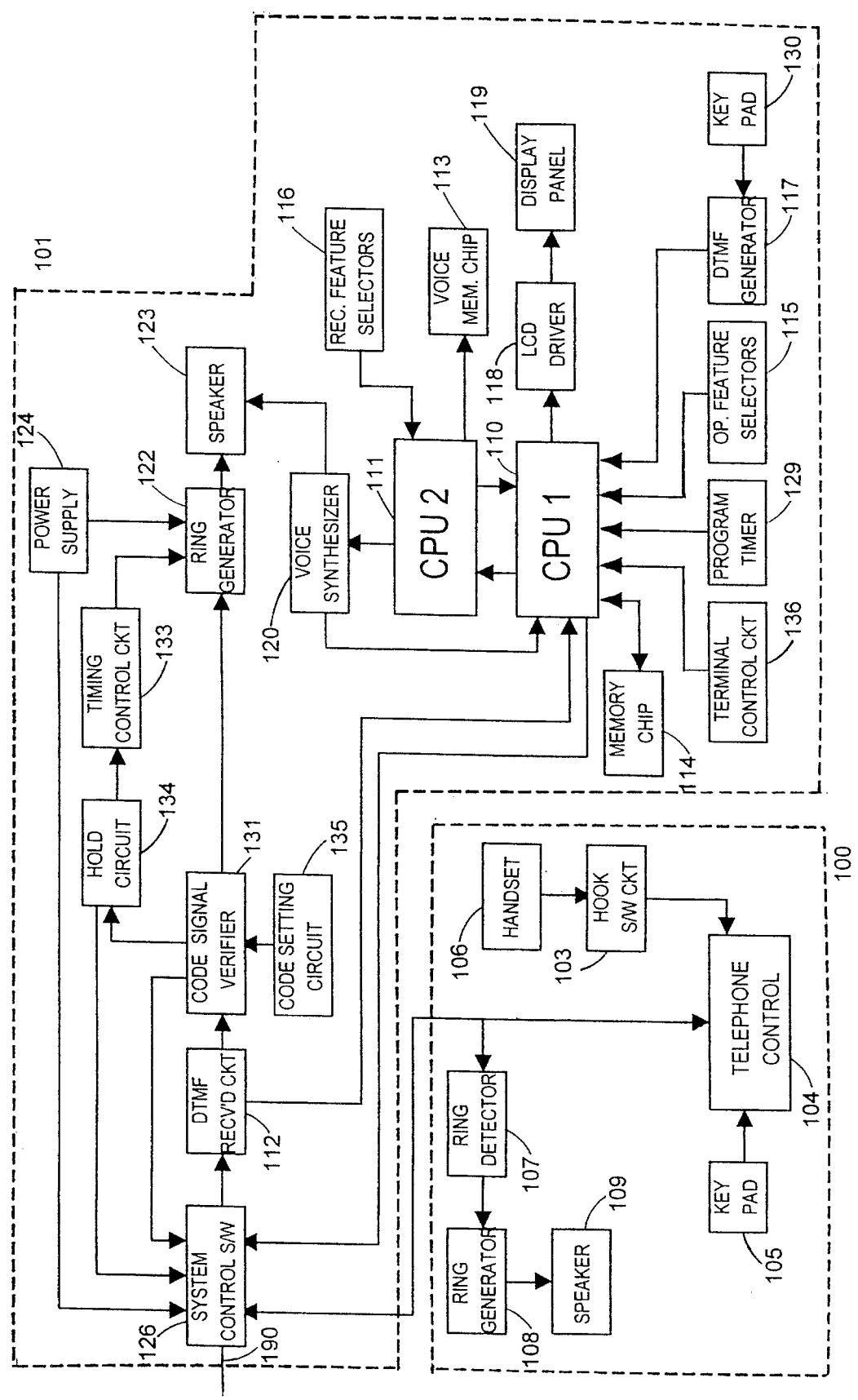
FIG. 5 is a block circuit diagram showing one embodiment of the base station which operates in conjunction with a telephone set.

One embodiment of the base unit utilized in the system of the present invention is illustrated by the block diagram of FIG. 5. Referring to FIG. 5, a telephone set 100 is adapted to the base unit circuitry 101 which is then connected to the telephone line 190. At least one processor 110, 111, is used to control the circuit operation. A power adapter 124 provides a DC power supply for operating the ringer generator 122, the speaker 123, and other power needs for the operations of the circuit 101. Before placing the base unit into service, the base unit is initialized with the information needed to screen incoming calls. Preferably, a telephone directory of desired telephone numbers, a set of security codes (including personal access codes and remote control access codes, terminal control codes, and specified transfer numbers including pager, cellular phone, and a designated telephone number), and outgoing messages are entered into the memory chips 114 and 113, accordingly. A typical menu driven data input procedure is described by the flow diagram of FIG. 6.

Figure 6:
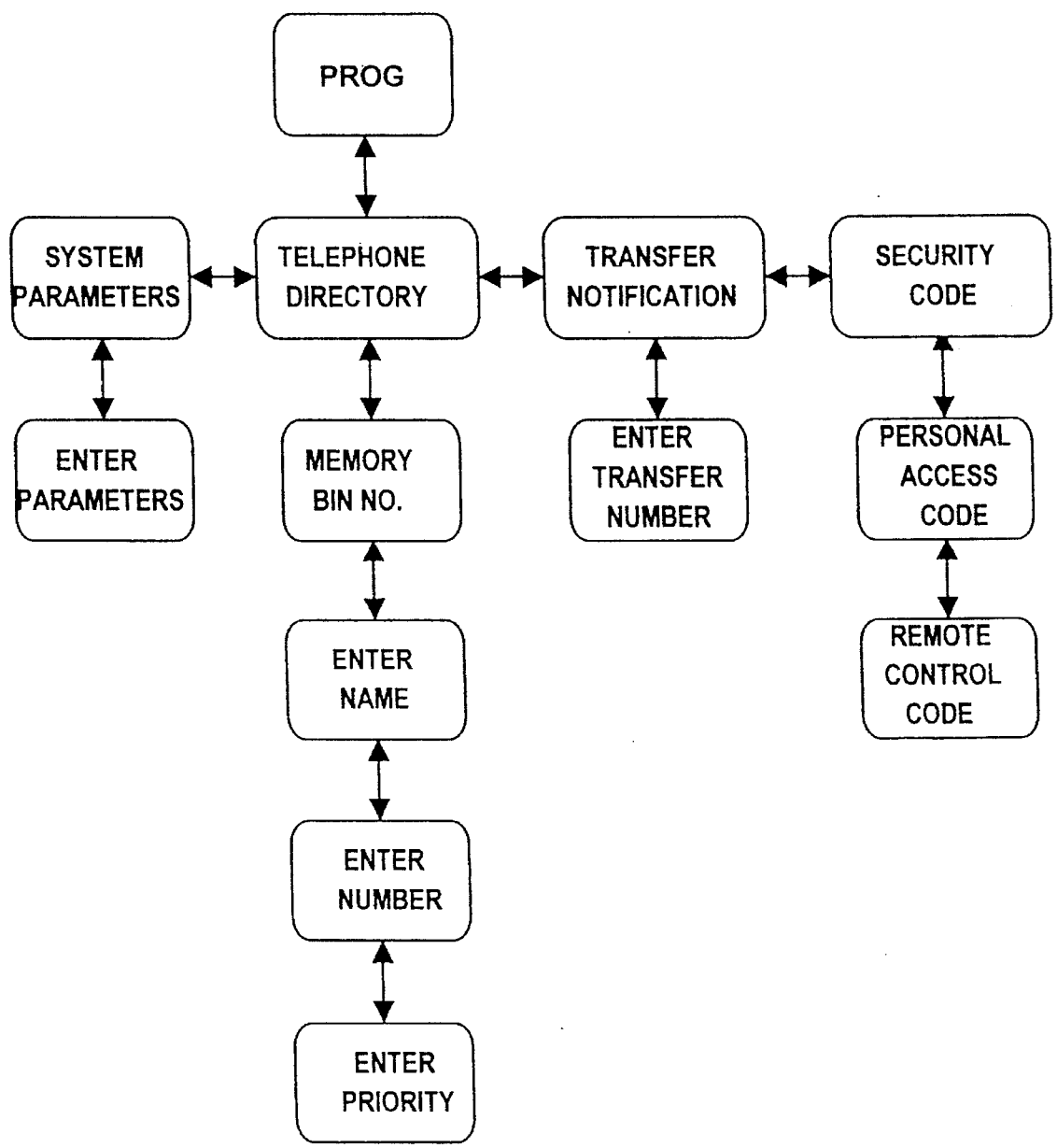
FIG. 6 is an exemplary flow diagrams illustrative program menus for data entry.

Referring to FIG. 6, for example, when the "Prog" feature key has been depressed, the symbol "PROG" will be illuminated on the base unit display 119 (FIG. 5), to indicate that the base unit is operating in the programming mode. When the "PROG" feature key has been depressed, the user can use control keys, e.g., <↑> and <↓>, or <→> and <←> to move up and down, and right and left to get into the different input modes for entering respective data as requested. To edit the existing data, for example, the user simply uses the control keys and follows the data input menu displayed to go to the data field to be corrected. Once the user reaches the desired data field to be modified, e.g., the number entry in the telephone directory, the user enters the correct data which automatically replaces the existing data. Thus, while in the process of creating a telephone directory, the input data will be shown on the display 119 (FIG. 5) as the user enters the information from the key pad 130 (FIG. 5).

Although an alphanumeric keypad may be included in the base unit, it is desirable that the traditional telephone keypad is used. FIG. 9 illustrates an entry system for entering characters through the telephone keypad. Thus, for example, to enter name information, the user presses the keys on the key pad 130 once or repeatedly to enter characters.

To enter numbers, the user presses the keys on the key pad 130 to enter telephone number exactly as if placing a phone call. Any mistake during the input process can be corrected simply by pressing the <←> and re-entering the intended key. To exit, press "#" to get out from the "PROG" mode, or press <↑> and <↓> to move to previous or next data field and continue the input process. After the telephone directory has been set up, the user can follow the program menu to search for the telephone number by entering the name.

The above discussion addresses one method for initializing the base unit. However, it is readily apparent from the discussion that many different ways may be utilized to enter the information needed by the base unit to function in accordance with the teachings of the present invention.

A priority code may be attached to specified telephone numbers of the telephone directory. The priority code is used to identify the respective number as a priority number. Preferably, a priority number causes the generation of a distinct ringing sound to notify the user that a priority call is incoming. In addition, a priority number may be given access during a limited access period, such as late at night.

Security codes provided by the system may consist of personal access codes, remote control access codes, and terminal control codes. The personal access code usually comprises multiple digits or a combination of alphabetical letters and numerical numbers, which allows the user (or a person designated by the user) to gain access to the user's phone system; this prevents the authorized person from being locked out when calling into the system from an external location. The remote control access code allows the user to retrieve or erase recorded information in the base unit and to set the operating features from a remote telephone set. The terminal control codes permit the user to operate other devices connected to the present invention at a location remote from the user.

Also stored in memory are the transfer telephone numbers of the user's pager, cellular phone, and/or designated remote telephone to which a call or a message is automatically transferred to. This information is input by the user to identify the necessary key stroke requirements of a normal calling procedure for placing a call to a pager, a cellular phone, or other telephone from a regular telephone set.

Preferably, the base unit includes a fully digitized voice recording circuit for recording incoming as well as outgoing messages. Referring back to FIG. 5, the voice recording circuit, which includes a microprocessor 111, voice memory 113, voice synthesizer 120, and recording feature selectors 116. In the present embodiment, the voice microprocessor 111 receives the operating instructions from the main microprocessor 110 and requests according to the recording feature selectors to record, review, and erase the following messages: outgoing messages, personal message, and callers' messages. It is readily apparent that the voice microprocessor 111 and main microprocessor 110 can be combined into one processor or state machine.

A digitized voice recording system simplifies the recording and the playback of messages. For example, the user can simply manipulate a few key strokes to review a certain message as well as to erase a certain message. Typical first outgoing message may be "You have reached the Doles' residence. This is a computerized telephone system. Please enter your telephone number, your call will be promptly connected or transferred." The second outgoing message, for example, may be recorded as "We cannot come to the phone right now. Please leave your name, phone number and message after the beep, and we will return your call as soon as possible. Thank you for calling." A digitized system enables the quick random access needed to provide prompt feedback and instructions to the incoming caller. Furthermore, it is preferred that the voice recording circuit also include a feature that allows the user to leave a personal message to an authorized person when the user is away from the system.

Figure 7:
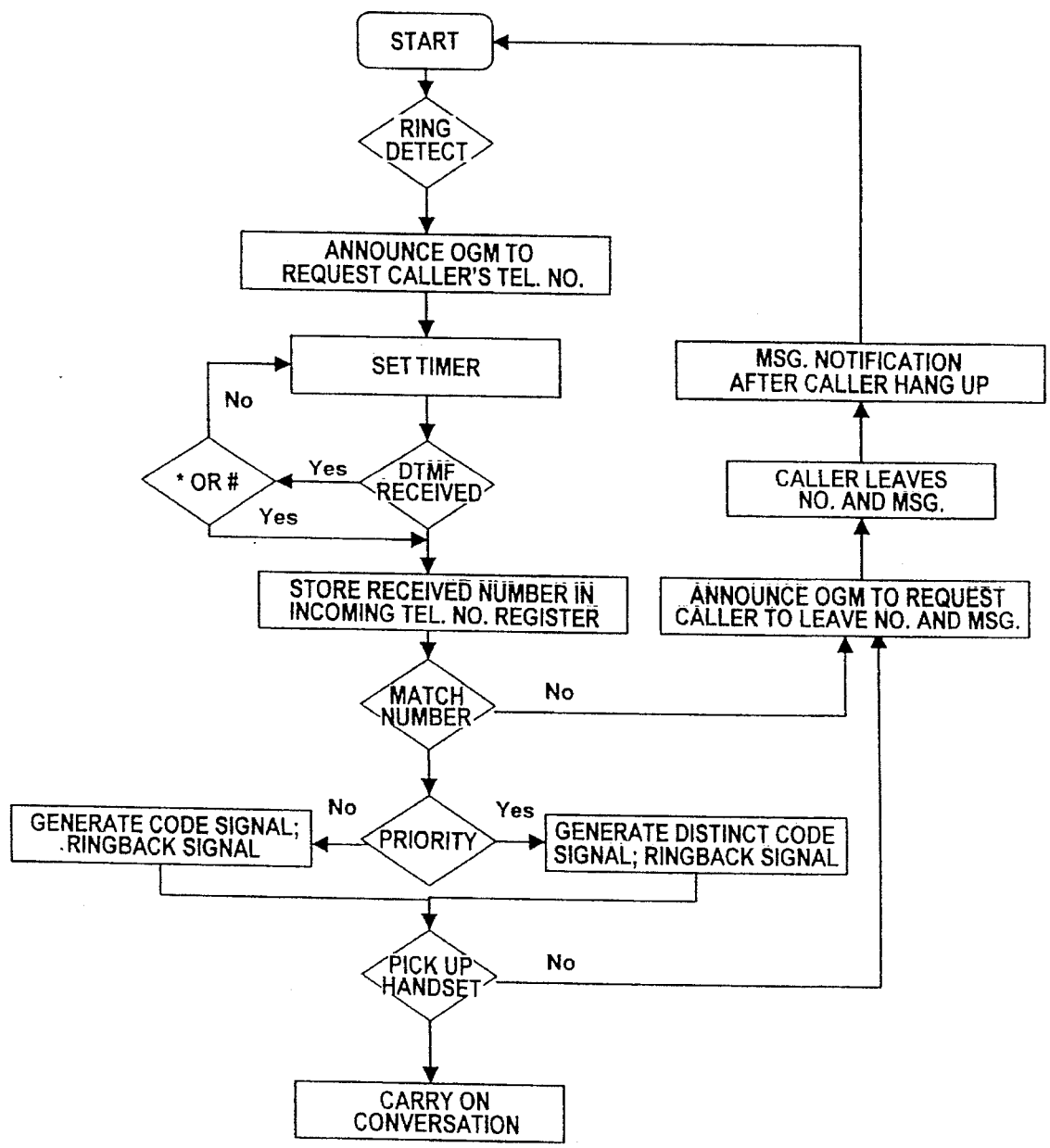
FIG. 7 is a flow chart illustrating the process employed by the system of the present invention.

Referring to the exemplary flow diagram of FIG. 7, a system control switch 126 functions as a selector to choose the operative mode of the base unit. When an incoming ringing voltage is detected from the caller from the CO over the phone line, the call is first answered by the microprocessor 110. The telephone set 100 is disconnected from the phone line momentarily, therefore, no ringing sound is emitted from the connected telephone sets. The microprocessor responds to the incoming ringing signal by announcing the first outgoing message to request the caller to input his/her telephone number. Preferably, this is achieved by the issuance of instructions given by the microprocessor 110 to the voice microprocessor 111 to retrieve the recorded information from the voice memory 113 and transmit the recorded information to the voice synthesized circuit 120 for generating the voice message.

After the call has been verified as a desired call, a preselected DTMF code is generated and transmitted at a low voltage at a regular interval manner, such as every 2 seconds, over the phone line as a ring back signal to the caller and a ringing signal to the ringer generator 122. The ring back signal causes a ringing signal to be generated back to the caller. The ringer generator 122 generates and audible ringing signal in response to the DTMF code. When an incoming call is a priority call, the preselected DTMF code is transmitted at an interval different from the one previously mentioned. This difference of intervals provides for a distinctive ringing sound for priority calls different from the other desired calls. In addition, this DTMF code signal will not interfere with the telephone switch board at the terminal station due to its low voltage. The use of a low voltage ringing signal allows the present embodiment to be connected in parallel to the telephone line and eliminates the need to connect the base unit at a specific location on the line, such as the closest location to the CO.

When the user picks up the handset 105 after he/she is alerted by the ringing sound from the speaker 123, an off-hook signal from the hook switch circuit 103 is detected and the system control switch 126 connects the telephone set 100 to the phone line 190. The user can then carry out a conversation with the caller.

When placing an outgoing call, the telephone is connected to the phone line as soon as the user picks up the handset 105. When the handset rests in the cradle, the base unit is connected to the phone line. The user may choose a feature operation from the operating feature selectors 115 in conjunction with the key pad 130 before picking up the handset or pressing the "Speaker" key.

When the base unit is used with other peripheral utility devices installed at the location of the extension telephone sets as part of an internal page/intercom system, the system control switch 126 directs the received code signal transmitted over the phone line from the calling device to the code signal verifier 131. Each device is preferably identified by a unique station I.D. code. If the station I.D. code is verified with the code set in the code assignor 135, the hold circuit 134 of the peripheral utility device holds the line and the timing control circuit 133 is initiated; meanwhile, the ringer generator 122 for emitting ringing sound at the speaker 123 is activated for a predetermined period of time. After a predetermined amount of time has elapsed as indicated by the timing circuit 133, the ringing sound ceases automatically and the line held is disconnected or connected to an answering machine in the system so that the caller can leave a message. If the handset is picked up, the timing control circuit 133 is reset, and the telephone set 100 is connected to the phone line so that communication through the telephone 100 can be initiated.

This capability is also used to implement other features. For example, when a received code signal is verified as one of preset codes, such as a code for "Privacy", the system control switch 126 disconnects the receiving telephone set from the phone line. This preserves the user's privacy by preventing a person located at another telephone set to participate in or eavesdrop on an ongoing phone conversation until either a deactivating or on-hook signal is received. In addition, the terminal control circuit 136 can be activated by specific codes initiated from the user at a remote location, such as a peripheral utility device or base unit at another location on the user's premises or through an incoming call to the system placed by the user, such as a peripheral utility device or base unit at another location on the user's premises or through an incoming call to the system placed by the user, through remote access codes to operate other devices (e.g., lights, security system, etc.). Preferably this is accomplished by initiating a page/intercom signal to the peripheral utility device to which the other device is connected and transmitting the control codes through the page/intercom through the peripheral utility device to control the device.

If a disruption in power is detected, the system control switch 126 will connect the telephone set 100 directly to the phone line. The telephone set will function as a normal telephone set without any operating features offered by the present embodiment of the system of the present invention. Therefore, the incoming ringing voltage transmitted over the phone line from a caller will trigger the ringer generator 108 of the telephone set 100 to alert the user of an incoming call.

The caller responds to the voice message request by entering his telephone number. The input signals are received by the DTMF circuit 112, and the corresponding data generated by the DTMF circuit 112 are stored in the incoming telephone number register (not shown) located in the memory chip 114. The means of accepting the input of the caller's telephone number is so designed that it allows the caller enough time to enter his/her telephone number. This is different from the prior art in which a predetermined period of time is set for the caller to enter the telephone number or the preset codes, a time which may not be long enough to complete the entry, leading to incorrect data entry.

Preferably, a predetermined period of time, such as 5 seconds, is given for the caller to enter each digit. Therefore, upon the DTMF receiving circuit 112 receiving an input from the caller, the internal clock is re-set to another predetermined period of time for the next input signal. The process of resetting the clock for each signal input is repeated until no additional input is received after the predetermined time has elapsed, or a special key, such as "#" or "*" is detected. This scheme provides sufficient time needed for entering each digit as opposed to a predetermined period of time for entering the complete telephone number or preset code. Furthermore, since it is the caller's telephone number that is requested by the system rather than a preset code, the caller typically will not have difficulty correctly remembering or inputting his/her own telephone number.

When the input signals are received from the caller over the phone line, the number appears on the LCD panel 119 and also is stored in the incoming telephone number register. Preferably a code derived from the input number is generated and compared to authorized codes derived from the telephone numbers stored in memory. The derived code is preferably formulated from the incoming telephone number register based on a preset algorithm. Many types of algorithms may be used for formulating the derived code. One typical algorithm is one which uses the entire telephone number entered. For example, the derived code may be determined from the seven digits of the telephone number, excluding the area code. However, the longer the code, the slower the verification process. A shorter verification code is therefore preferred. For example, any number combination (of 2, 3, or 4 digits) derived from the last four digits of the telephone number may be used to generate the derived code. By using the shorter code, processing time is saved, at a small cost of potential duplication of codes due to phone numbers having the same last four digits. This is due to the observation that many have the same regional code (the three digits of a telephone number following the area code). Therefore, the additional three digits (or six digits) do little to add to the uniqueness of the phone number.

The derived code generated from the incoming telephone number register is then compared with a derived identifier code generated from the authorized access telephone numbers stored in the memory chip 114 (FIG. 5). The derived codes are preferably generated once and stored in the memory; however, the codes can be quickly generated from the stored telephone numbers on an as needed basis. Because a user's telephone directory of authorized telephone numbers typically contains under one hundred telephone numbers, the matching procedure will be fast and virtually unnoticeable to the caller.

If the caller fails to enter his complete telephone number, the incoming telephone register records an incorrect number of "0000000000". Generally, the error is detected when a length of input is shorter than 7 digits with exception of the personal access code which is prefixed with a symbol of either "#" or "*". If the personal access code is received as "#1234" or "1234", the incoming telephone register will record the number as "000001234". In a case of the caller refusing to enter his/her telephone number after the predetermined time has elapsed, the incoming telephone register will again record an incorrect code of "0000000000".

If an incorrect code is detected, the matching process is skipped and ringback signals are transmitted over the phone line to the caller. The ringback signals function to let the caller know his call is being processed and give the caller a friendly feeling toward the operating environment. Subsequently, a second outgoing message is announced after a predetermined number of ringback signals. The caller is then requested to leave his name, number, and a message. The caller's message transmitted over the phone line is converted to digital data and stored in the voice memory 113. A counter means (not shown) is preferably included to count the numbers of messages left by the callers. Each message is then indexed with the respective counting number. Preferably, the total count is displayed on the base unit accompanied by a blinking LED light to alert the user that there are messages left by callers.

If a match is found from the comparison of the derived code from the incoming telephone number and a derived identifier code from one of the authorized telephone numbers stored in the telephone directory, a ringback signal is generated and transmitted over the phone line to the caller. These ringback signals also trigger the ringer generator 122 to generate a ringing sound from the speaker 123 to alert the user that there is a desired call. The user then can pick up the handset 106 to carry on a conversation with the caller. If a match is found with a code that corresponds to an authorized telephone number with priority, a different ringback signal triggers the ringer generator 122 to emit to the user a ringing sound distinct from a standard ringing sound.

The system is designed to ringback a predetermined number of times, such as six times. If the user fails to pick up the handset within the allotted number of rings, the incoming call is diverted to the recording circuit and the second outgoing messages is announced to the caller (requesting that the caller leave his name, phone number and message).

The system preferably includes a programmable timer, 129, to identify the time of day during which only priority telephone numbers have access to the user. Thus, if the timer 129 is activated, only the telephone numbers indexed with the priority code will be considered to be valid identifier codes during the programmed time period. This embodiment is so designed to allow only the callers whose telephone numbers are indexed with priority code to gain access to the user's telephone during off-time or night periods, for example, between 10 P.M. to 6 A.M.

Figure 10:
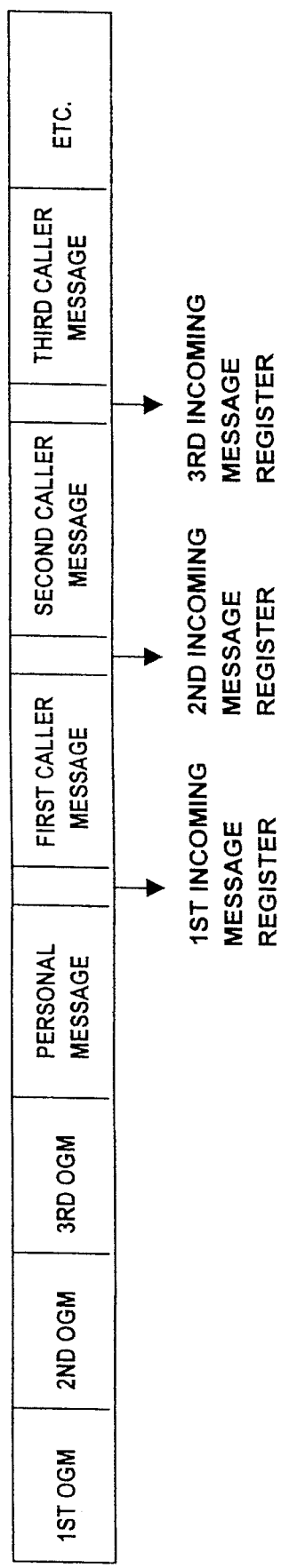
FIG. 10 illustrates a layout of memory of recorded information in the voice memory means.

FIG. 10 is a block diagram illustrative of the types of messages and their stored sequence in voice memory 113. This configuration is illustrative only; it is readily apparent that other memory configurations may be used. The first two memory locations are used to store the first and the second outgoing messages. The third memory location is designated for storage of a third outgoing message such as a personal message. The following locations store incoming telephone numbers and the digitized voice message left by the caller. Therefore, as shown in FIG. 10, the fourth location is reserved for the first caller's telephone number, that is the number temporarily placed in the incoming telephone register when the caller has entered the phone number. This number is digitized and stored in a data or voice synthesized format. The fifth location immediately following the storage of the telephone number provides for storage of the caller's message. Preferably, if the caller fails or refuses to enter his number, the "no number" code is stored followed by the caller's message. However, if the caller fails to leave a message (for example, the caller hangs up), no information is entered into the voice memory.

One reason for storing the incoming telephone number is as a precaution in case the caller forgets to give his telephone number in his message. This number stored can be subsequently retrieved by the user. Furthermore, the user can utilize the feature "Display Dial" to place a phone call on the telephone number displayed on the LCD panel as it is retrieved from the voice memory. Additional messages are similarly stored; the maximum number of messages stored in the voice memory is dependent upon the capacity of the voice memory 113 (FIG. 5).

Figure 8:
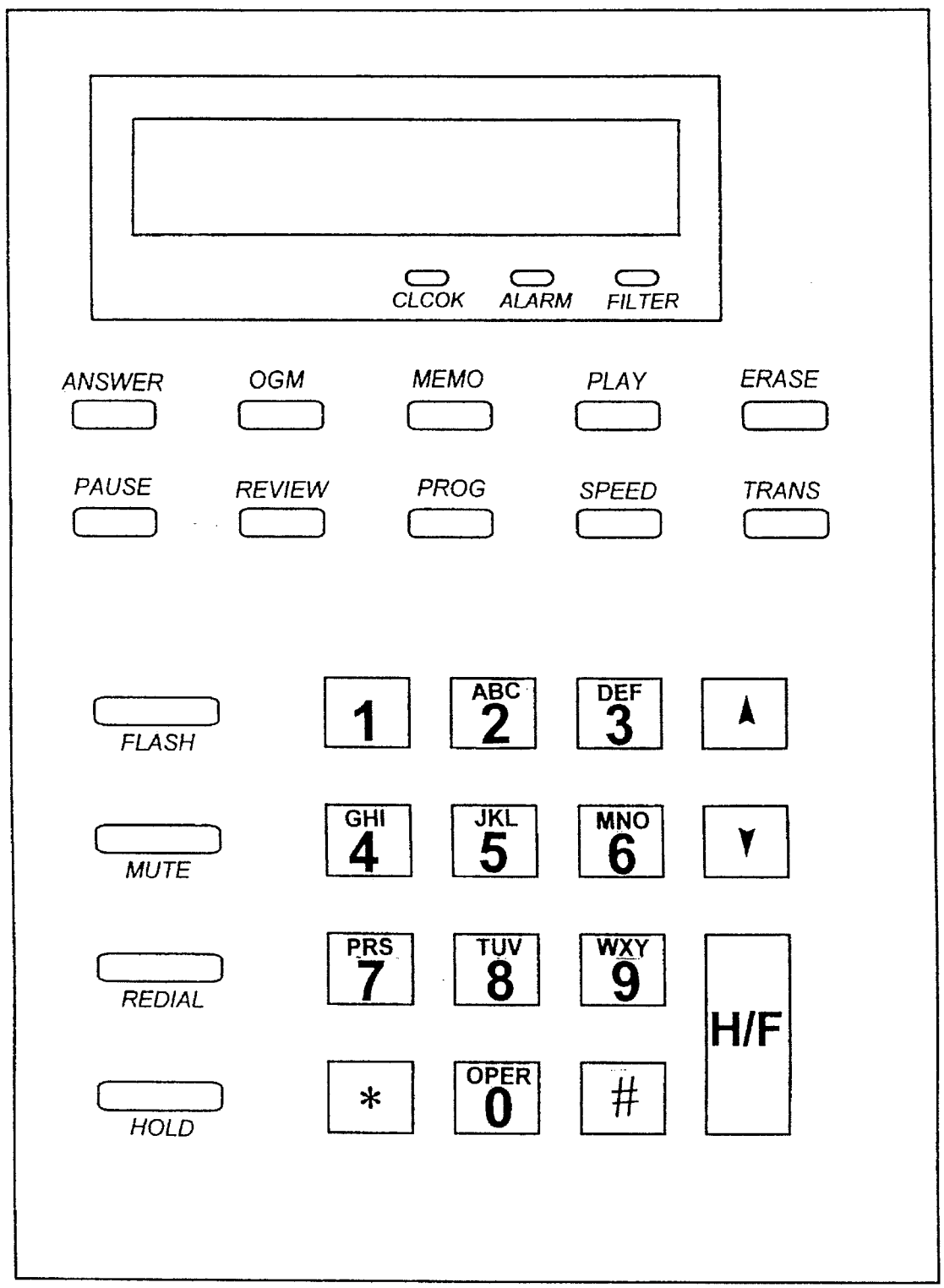
FIG. 8 illustrates an exemplary basic unit layout utilized in one embodiment of the present invention.

Referring back to FIG. 5, the recording feature selectors 116, enables the selection of standard answering machine features. Because the recording and announcing are fully digitized and randomly accessible, the user can record, review, or erase any of the recording messages by manipulating the selection options in conjunction with the key pad 130. For example, referring to the exemplary base unit interface of FIG. 8, to record a first outgoing message, the user presses the selector button "OGM" and sequentially presses the button "1" of the key pad 130 (FIG. 5). Similarly, the second outgoing message and personal message can be recorded by selection of the proper key and buttons on the key pad to identify the memory locations. For example, if the user wishes to review a particular message, the user presses the selector button "PLAY" and the number button(s) of the memory location on the key pad 130 to play the messages left by the "n'th" caller. To listen to the same messages again, the user simply presses the same number button on the key pad again. To go forward or backward from the present messages for listening, the user simply presses a designated key, such as <↑> and <↓>. To erase any message, the user moves to the location of the message and presses the selector "ERASE", preferably after listening to the message. Similarly, if the user wishes to listen to a personal message, the user simply presses the selector "MSG" to play the personal message. Further, failure to complete an entry to execute a selected function after a predetermined amount of time will cause the selected function to be automatically deselected or turned off.

As noted earlier, memory 114 (FIG. 5) stores the telephone directory security codes and transferring telephone, pager, and cellular phone numbers. An exemplary layout of the memory is illustrated by the diagram of FIG. 11. Preferably, the first ten telephone numbers of the telephone directory are reserved for the user's immediate family members, nearest associates, or the most often dialed telephone numbers. Most likely, these numbers are also indexed with priority code and can also be used in the "Speed Dial" feature of the system. When the user wishes to place a phone call by speed dialing, he simply presses the feature selector "Speaker" or picks up the hand set 106, and then presses the feature selector "Speed Dial" followed by a number corresponding to the memory location of the desired number. The microprocessor 110 (FIG. 5) receives the signals corresponding to the instructions received from the feature selector and the DTMF signals from the key pad to retrieve the telephone number from the memory 114 (FIG. 5) and automatically places a phone call on the telephone line by controlling the signal generator 117 (FIG. 5) to dial the retrieved number. The retrieved telephone number also is preferably shown on the display 119.

An innovative transfer means is included in the base unit to transfer incoming calls and/or messages to the user when the user is not at home. In particular, options are provided to transfer incoming calls or messages to a pager, cellular telephone or other designated telephone number. In the preferred embodiment, messages are relayed by the base unit to the user via the identified telephone, cellular or pager number. If the base unit is to transfer to a regular or cellular telephone after a predetermined number of messages are received, the base unit automatically dials one of the user's designated transferred numbers. If the user answers the call from cellular phone or designated telephone, the user will hear a short message such as "you have messages" transmitted over the phone line. The user can then respond by manipulating remote control codes to listen to the message(s) and telephone number(s) stored in the voice memory 130 of the base unit. If the transfer means is to communicate with a pager, the base unit automatically dials the user's pager number and sends the caller's telephone number as a message to the pager in the same manner as if the caller called the user's pager to leave a message. Alternately, the transfer means leaves a message or code for the user notifying the user to call the telephone system to retrieve messages.

Once the designated transferred numbers are stored in the memory of the base unit, the user simply activates the transfer feature by pressing the selector "Call Transfer"(FIG. 8) Alternately this feature may be enabled remotely through control codes. Thus, after the caller has left his message and number with the base unit, the microprocessor 110 automatically dials the designated transfer number retrieved from the memory to announce a short message or transmit the number left in the voice memory in order to alert the user's cellular phone (other telephone) or pager, respectively. This feature provides a complete integration of the user's telephone system and other communication devices, including the user's other designated regular telephone, cellular phone, and/or pager. This kind of integration offers a most economical and effective way of communication with the user in order that the user can be reached at anytime and anyplace with absolute privacy.

Furthermore, "Hold", "Mute", and "Flash" are included in the operating feature selectors of the embodiment. Functions of these selectors are not discussed herein, because most telephone users are familiar with their usages. In addition to the "Speed Dial" function, the system also includes "Redial", "Repeat Dial", and "Display Dial" in the dialing features. "Redial" is to dial the last number which the user placed. "Repeat Dial" continuously dials the calling number at a predetermined interval time until the called party answers the phone call. "Display Dial" is used to place a phone call on the number shown on the display 119 when the user retrieves the recorded telephone number left by caller.

Figure 12:
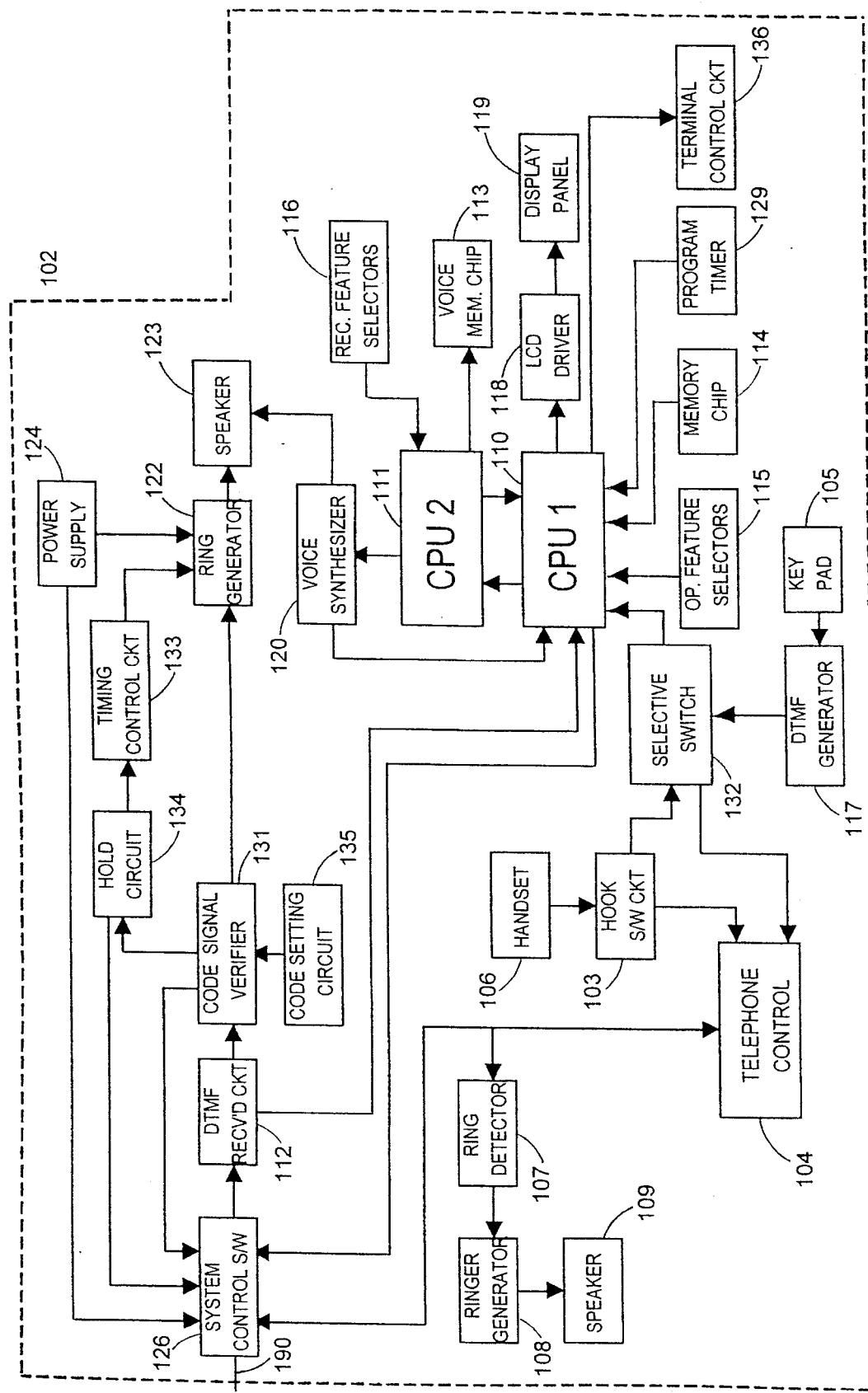
FIG. 12 is a block circuit diagram showing an embodiment of the base unit of an alternate embodiment in which the base use is a stand alone operating telephone unit.

An alternate embodiment of the base unit of the present invention is illustrated in FIG. 12. In this embodiment, the base unit 102 is a stand alone fully operating telephone set which includes the base unit features described above and can be directly plugged into any phone jack on the wall of the user's premises.

Referring to FIG. 12, a selective switch 132 is located between the hooking switch circuit 103 and the operating feature selectors 115 for determining how the dial signal generator 117 and key pad 105 are to be connected. The dial signal generator 117 is connected to the telephone control circuit 104 when the user picks up the handset 106 or presses the "Speaker" button on the operating feature selectors 115. Once the user is connected to the telephone control circuit, the user can use the key pad to place an outgoing phone call and the signal generator 117 generates the necessary DTMF signals. However, if an operating feature selector is pressed after the user picks up the handset, the dial signal generator 117 is connected back to the microprocessor 110 to execute operation instructions. The dial signal generator 117 is always connected to the microprocessor 110 if the telephone is resting on the telephone cradle. Therefore, although only one key pad is provided for the combination base unit/telephone, all the operating features mentioned earlier with respect to the first embodiment can be operated in the same manner by the present embodiment.

Figure 3:
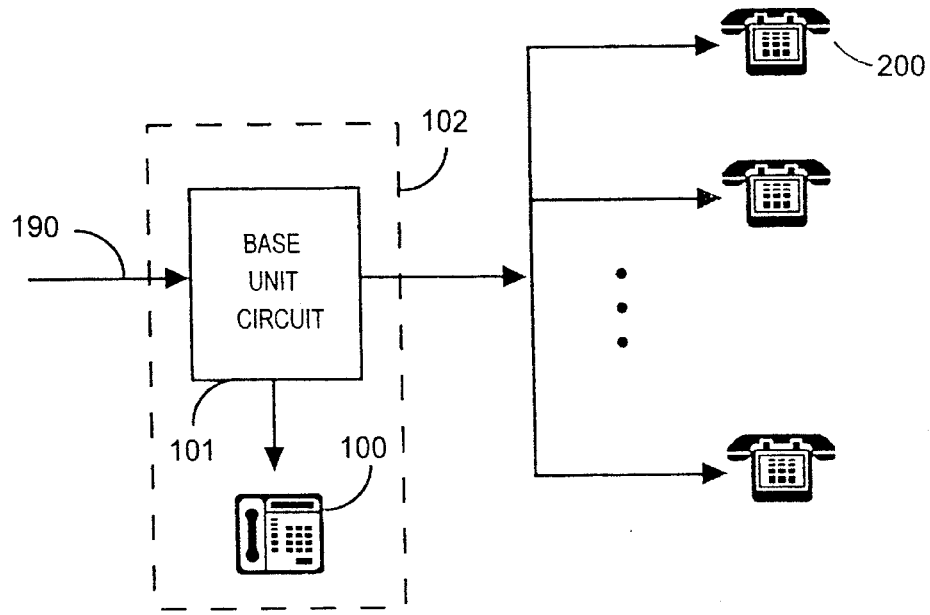
FIG. 3 illustrates an alternate embodiment of the system of the present invention in which the base unit circuit is connected serially with the central office line and telephone sets.

The base unit can be connected to an internal telephone system such as the ones depicted in FIGS. 1 and 3. In the illustrated systems, both embodiments of base units 101 and 102, as shown in FIG. 1, can be connected to any phone jack on the user's premises; however, the remaining extension telephone will ring as the base unit receives the ringing signal transmitted over the phone line from the caller. Although the user may turn off the ringing mechanism of every extension phone set to avoid the annoying ringing sound from every incoming phone call, no ringing sound at each extension phone set can be subsequently emitted even if the call is authorized for access. In this situation, the user may not hear the ringing sound from either the base unit 101 or 102 if he is a distance away from the location of the base unit.

Alternately, the base unit can be plugged into the closest phone jack to the outside phone line on the user's premises and connect the remaining telephones serially after the base unit (such as is illustrated in FIG. 3). In this case, the rest of the extension telephone will remain silent as the base unit immediately answers the incoming phone call. However, it is not an easy task to locate the nearest phone jack to the outside phone line and to connect the base unit 101 or 102 as well as the other extension telephones in a serial form. If the base unit is not located at the first phone jack of the internal telephone line, the extension telephone installed in front of the base unit will still emit the ringing sound as a ringing signal from the caller over the phone line is received. The extension telephone set installed after the base unit, however, will remain silent. Again, all the extension telephone will not emit an alerting ringing sound even if the incoming telephone number is found to be a desired one.

Figure 13:
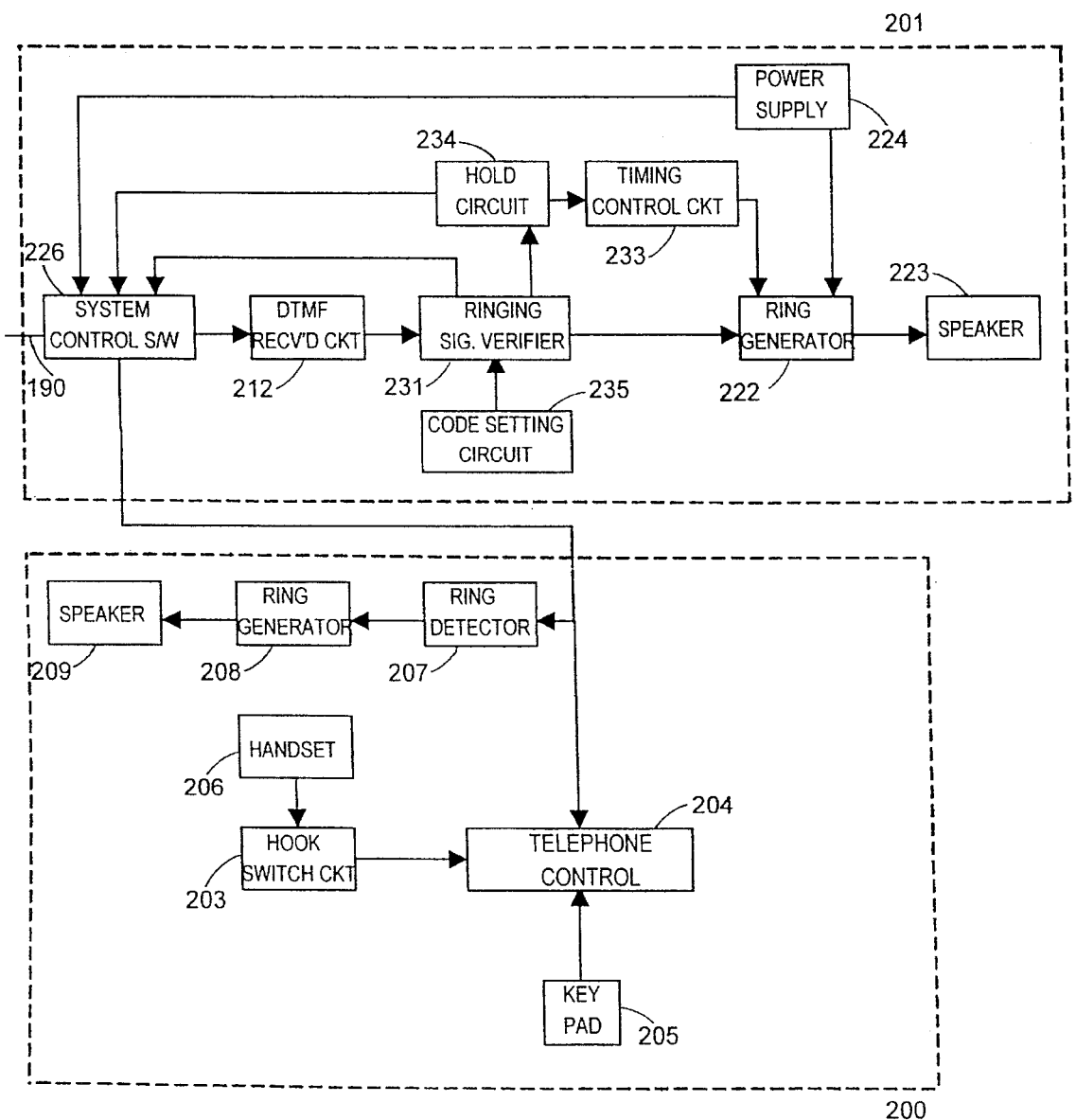
FIG. 13 is a block circuit diagram illustrating one embodiment of the peripheral utility device.

In order to resolve the aforementioned problems, it is preferred that a peripheral utility device (PUD) is connected in between each extension phone set and a wall phone jack on the user's premises, as illustrated in FIGS. 2 and 4. One embodiment of a PUD is illustrated in FIG. 13. The PUD 201 enables the extension telephone to be connected to any phone jack on the user's premises such that the extension telephones only ring when a caller is authorized.

Referring to FIG. 13, the PUD 201 includes a power supply 224 to provide the DC power needed for the ringer generator 222 and other power needs for operating the PUD. A device control switch 226 controls the PUD to be in an operative or inoperative mode. It functions similarly as that of the system control switch 126 in the base unit. Therefore, when in the inoperative mode, the device control switch 226 causes the telephone handset to be directly connected to the telephone line. When in the operative mode the handset 206 rests on the cradle, only the PUD is connected to the phone line 290. The ringing voltage transmitted over the phone line from the caller will not trigger the ringer generator 208 to emit alerting ringing sound. The DTMF receiving circuit 212 detects a received code transmitted over the phone line 290 from the base unit or other PUDs (in page/intercom mode) and directs the code signal to the code signal verifier 231. When a preselected code of an authorized call transmitted from the base unit has been received and verified, the code activates the ringer generator 222 to emit a ringing sound at the speaker 223 to alert the user of an incoming call. If a code of an authorized call is one identified to have priority, the ringer generator is triggered to emit a distinct ringing sound different from that of a regular authorized call. When the device control switch 226 detects an off-hook signal from the hook switch 203 as the user picks up the handset 206, the telephone set is connected to the telephone line to allow the user to operate the telephone set as usual. Thus, an intercom conversation can be easily carried on between two users of the system.

The page/intercom feature may also be used to transfer an incoming call from one PUD to another. When a called station I.D. code transmitted over the phone line 290 from any one of the phone sets, including the base station on the user's premises, is received and verified by the code set in the code assignor circuit 235 of the called device, the hold circuit 234 of the verified station is activated to hold the line so that it is not disconnected and the ringer generator 222 causes the speaker 223 to emit an alerting ringing sound at the speaker 223 for a predetermined period of time controlled by the timing control circuit 233. When the predetermined amount of time indicated by the timing control circuit 233 elapses, the ringing sound ceases automatically and the line held is disconnected for failure of the user to answer. Alternately, the call is forwarded to an answering machine so that the caller can leave a message. However, if the handset 206 is picked up, the timing control circuit is reset and the phone set 200 will be connected to the phone line. Preferably, to initiate a page/intercom signal to all connected devices, a special code is used such that the page signal will occur at all locations.

When the received code signal is verified as one of a set of preset codes, such as a code for "Privacy", the device control switch 226 disconnects the telephone set 200 from the phone line in order to preserve the user's privacy by preventing another person using another telephone set to participate or eavesdrop on an ongoing phone conversation. The privacy function is enabled until either a further deactivating or on-hook signal is received.

When in a power off situation, the device control switch 226 connects the telephone set 200 to the telephone line such that a ringing sound will be emitted from the speaker 209 when a ringing voltage transmitted over the phone line from a caller is detected by the ring detector 207 of the phone set. In other words, the phone set 200 will remain operative even in a case of power off.

Figure 14:
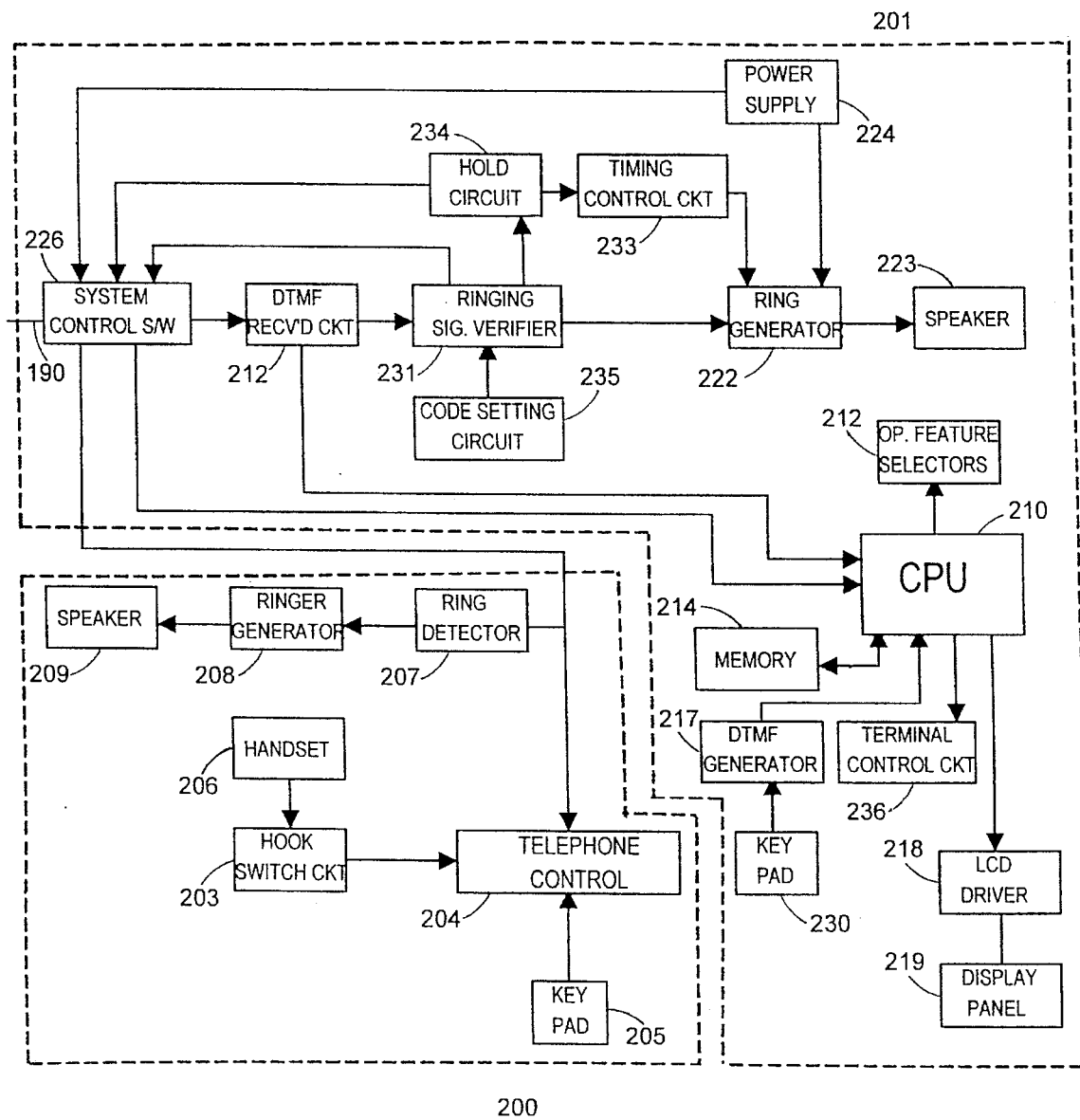
FIG. 14 is a block circuit diagram illustrating an alternate embodiment of the peripheral utility device.

An alternate embodiment of the PUD is illustrated in FIG. 14. Referring to FIG. 14, an enhanced PUD 210 is connected between the extension phone set 200 and a phone jack on the user's premises. In this embodiment, a microprocessor 210 is employed to perform enhanced functional features which include repeat dial, speed dial, hold, flash, mute, privacy, silence, as well as other terminal control features. A memory 211 is used to store the last dialed telephone number, the telephone numbers for speed dial, and other preset codes for terminal control operations.

Another feature provided is the "Privacy" button. When the "Privacy" button is depressed, a precoded signal is transmitted over the phone line to the other phone sets to lock out all the PUDs and the base unit from participating in an ongoing conversation except the phone sets are already at off-hook. The code signal is detected and verified by the code verifier 131 and 231 of the PUDs and base unit, respectively, to disconnect the corresponding handset from the phone line. This disconnection is subsequently deactivated when the devices receive the on-hook signal transmitted over the phone line as the user ends his phone call or alternately when the user again presses the "Privacy" button feature to deactivate. Privacy will be canceled when all the handsets rest on their cradle.

The "Silence" button overrides the ringing mechanism of the PUDs. More particularly, the PUD will remain silent by not emitting ringing sounds despite the transmission of ringback signals by the base unit. If this feature is selected, the benefits of emitting an alerting ringing sound from every PUD as well as providing an internal Page/Intercom system for the user's telephone system are temporarily voided.

In a preferred embodiment, the user activates the terminal control circuit 236 by specific codes from a remote location by using remote access codes to operate other electrical or electronic devices. Specifically, the user can perform a functional control at a desired location where he has a PUD installed by paging the designated telephone set first and following with entering a designated control function code. Thus, for example, if a PUD is connected to a light or television, the telephone system of the present invention may be used to remotely access the light or television by use of specific codes in order to turn the connected device on or off.

To operate the base unit and peripheral utility devices on the user's premises as an internal integrated page/intercom system, a station I.D. code is assigned to each station by the code assignor 135 and 235 in both the base unit and PUD, respectively. If the system is intended for paging applications, the same station I.D. code is assigned to each station. In this configuration, all stations (consisting of a PUD/telephone set) will emit a ringing sound when a paging code is initiated from any other station on the user's premises. However, if a different station I.D. is assigned to each station, a ringing sound is emitted from the designated station when the station I.D. code signal received by the designated station is verified. The remaining stations remain silent because the received station I.D. is not verified.

The repeat dial mechanism employed by both the base unit and PUD can be facilitated by several different approaches. Only two approaches will be discussed herein. In one embodiment, the repeat dialing is facilitated by setting a length of time for ringing. Once the maximum ring time is reached, an on-hook signal is sent by the base unit or PUD to disconnect from the telephone line. Periodically thereafter, the automatic dialing feature is activated to dial the last number. Although this is inexpensive to implement, the phone line is occupied or busy and for the duration of the redial operation, no incoming calls can gain access to the user's telephone. Alternately, the number of rings is used as a criteria for disconnecting the phone line. This requires a counter to keep track of number of rings. Using this embodiment, the base unit or PUD disconnects the phone line after a predetermined number of rings. After a preset interval, the base unit or PUD redials the number. Although the counter mechanism adds additional complexity and overhead to the base unit or PUD, the impact on phone line usage is not as great.

While the present invention has been described in connection with what is presently considered to be the most practical and preferred embodiments thereof with reference to the accompanying drawings, it is to be noted that the present invention is not to be limited to the disclosed embodiments. On the contrary, various changes and modifications are apparent to those skilled in the art, and are not to be considered as a departure from the spirit and scope of the present invention. In addition, all such modifications and equivalent arrangements as would be apparent to those skilled in the art are intended to be included within the scope of the following claims.

What is claimed is:

1. A telephone system coupled to receive telephone signals including a high voltage ringing signal issued to signal an incoming telephone call, and issue telephone signals through a telephone line, said telephone system comprising:

at least one peripheral utility device coupled to the telephone line;

at least one telephone comprising a telephone handset, said handset comprising a receiver, said telephone coupled to the peripheral utility device;

a base unit coupled to the telephone line, said base unit comprising;

memory for storing a list of at least one authorized telephone number, said list stored in memory identifying telephone numbers of callers authorized to contact a called party, means for answering the incoming telephone call from a caller, means for prompting the caller of the answered incoming telephone call to input a telephone number of the caller, means for comparing the telephone number input by the caller to the list stored in memory to determine whether the caller is authorized to contact the called party, means for issuing a low voltage DTMF ringing signal on the telephone line to the at least one peripheral utility device, said means for issuing responsive to the means for comparing, and issues the low voltage DTMF ringing signal if the caller is authorized to contact the called party, said low voltage DTMF ringing signal at a voltage lower than the high voltage ringing signal, and means for connecting the caller of the answered incoming telephone call via the telephone line and the peripheral utility device to the telephone if the handset is picked up by the called party to answer; said peripheral utility device comprising;

means for blocking the incoming high voltage ringing signal from reaching the telephone by preventing the high voltage ringing signal from reaching the telephone, and means for detecting the low voltage DTMF ringing signal on the telephone line and causing a low voltage ringing sound to be generated at a location of the peripheral utility device to notify the called party of the answered incoming telephone call;

wherein the called party is only notified of the answered incoming telephone call if the answered incoming telephone call is an authorized incoming call.

2. The telephone system as set forth in claim 1, wherein said base unit further comprises:

a base unit telephone comprising a receiver and a handset; and a switching means to selectively switch the high voltage ringing signal of the incoming telephone call directly to the base unit telephone, such that when the switching means is in a first state, the base unit answers the incoming telephone call and issues the low voltage DTMF ringing signal only if the caller is authorized to contact the called party, and when the switching means is in a second state, the high voltage ringing signal of the incoming telephone call is routed to the base unit telephone, said base unit telephone generating ringing sounds responsive to the high voltage ringing signal, wherein the called party can answer the incoming telephone call by picking up the handset of the base unit telephone.

3. The telephone system as set forth in claim 2, wherein the switching means is in the second state when the base unit is in a power off state.

4. The telephone system as set forth in claim 1, said base unit further comprising a personal access code stored in the memory, said personal access code enabling the caller to be authorized by the system to contact the called party such that the called party is notified of the answered incoming telephone call; said means for comparing further comprising means for comparing a caller personal access code entered by the caller to the personal access code stored in the memory to determine whether the caller is authorized to contact the called party.

5. The telephone system as set forth in claim 1, said base unit further comprising a remote access code stored in the memory, said remote access code enabling a caller to be remotely authorized by the system to access the system such that the remotely authorized caller can access the base unit and perform certain functions related to system operation; said means for comparing further comprising means for comparing a caller remote access code entered by the remotely authorized caller to the remote access code stored in the memory to determine whether the remotely authorized caller is remotely authorized by the system to access the system.

6. The telephone system as set forth in claim 1, wherein said prompting means comprises voice storage means for storing at least one voice message and voice playback means to play back the at least one voice message.

7. The telephone system as set forth in claim 1, wherein said base unit further comprises a message recording means which records caller messages.

8. The telephone system as set forth in claim 7, wherein said message recording means records a message from the caller when the caller is not authorized to contact the called party, said base unit further comprising message switching means to switch the answered incoming telephone call to the message recording means if the caller is not authorized to contact the called party, said message recording means further comprising a message prompting means to prompt the caller of the answered incoming telephone call to leave a message.

9. The telephone system as set forth in claim 7, wherein said message recording means records a message from the caller when the called party does not answer, said message recording means further comprising a message switching means to switch the answered incoming telephone call to the message recording means if the called party does not answer, said message recording means further comprising a message prompting means to prompt the caller to leave a message.

10. The telephone system as set forth in claim 7, said base unit further comprising a message transfer means comprising:

at least one transfer telephone number stored in memory;

a telephone calling means to contact the called party at the at least one transfer telephone number and notify the called party that at least one message has been left for the called party.

11. The telephone system as set forth in claim 10, wherein said message transfer means further comprises message access means for the called party to access the at least one message when the called party is notified that the at least one message has been left for the called party.

12. The telephone system as set forth in claim 10, wherein said at least one transfer telephone number comprises a pager telephone number, said telephone calling means further generating tones required by a paging system to notify the called party of at least one message.

13. The telephone system as set forth in claim 1, wherein the list stored in memory of at least one authorized telephone number further comprises a priority code to identify certain authorized telephone numbers as priority telephone numbers.

14. The telephone system as set forth in claim 1, wherein:

said means for issuing the low voltage DTMF ringing signal further comprises means for issuing a first type of internal ringing signal if the authorized telephone number of the caller is a priority telephone number and a second type of internal ringing signal for other authorized telephone numbers; and said means for detecting the low voltage DTMF ringing signal further comprising means for issuing a first signal causing the peripheral utility device to generate a first type of ringing sound if the first type of internal ringing signal is detected, and means for issuing a second signal causing the peripheral utility device to generate a second type of ringing sound if the second type of internal ringing signal is detected;

such that the called party can audibly distinguish priority incoming calls.

15. The telephone system as set forth in claim 1, wherein said base unit further comprises limited incoming call timing means that inhibits any authorized and unauthorized incoming telephone calls during specified hours, such that the called party is not notified of an incoming telephone call during the specified hours.

16. The telephone system as set forth in claim 1, wherein the base unit further comprises:

means for determining if the incoming telephone call is a priority call; and limited incoming call timing means that permits access to the telephone system during predetermined hours only if the incoming telephone call is a priority call.

17. The telephone system as set forth in claim 1, wherein the list stored in memory of at least one authorized telephone number comprises at least one caller access code identifying a caller authorized to contact the called party, said means for comparing comprises:

means for deriving a derived caller access code from the telephone number input by the caller;

means for accessing the caller access code from the list stored in memory of at least one authorized telephone number;

means for comparing the caller access code to the derived caller access code to determine whether the caller is authorized to contact the called party, wherein if the derived caller access code and the caller access code match, the caller is authorized to contact the called party.

18. The telephone system as set forth in claim 17, wherein the derived caller access code is stored in the list stored in memory of at least one authorized telephone number with a corresponding telephone number from which the derived caller access code was derived.

19. The telephone system as set forth in claim 17, wherein the derived caller access code comprises a substring of the telephone number input by the caller.

20. The telephone system as set forth in claim 1, said base unit further comprising a display means for displaying information regarding operation of the base unit.

21. The telephone system as set forth in claim 20, wherein information displayed comprises telephone numbers of incoming and outgoing calls.

22. The telephone system as set forth in claim 1, wherein said base unit further comprises a user operation interface means enabling a user to modify operation of the telephone system.

23. The telephone system as set forth in claim 22, wherein said user operation interface means comprises means for modifying the list stored in memory of authorized telephone numbers.

24. The telephone system as set forth in claim 1, further comprising a page or intercom means, the base unit and peripheral utility device, collectively referred to herein as stations, each station further comprising:

a station identification to uniquely identify the station;

means for issuing a page or intercom signal across the telephone line by issuing a page or intercom signal comprising the station identification;

means for detecting the issuance of a page or intercom signal comprising means for determining if the station identification issued with the page or intercom signal matches the station identification of the station; and means for generating an alerting signal at the station to notify a paged party of the page or intercom if the station identification issued with the page or intercom signal matches the station identification of the station.

25. The telephone system as set forth in claim 24, wherein said page or intercom means further comprises a means for establishing communication between the station which issued the page or intercom signal and the station identified by the station identification of the issued page or intercom signal.

26. The telephone system as set forth in claim 1, wherein said at least one telephone includes a plurality of telephones and the at least one peripheral utility device includes a plurality of peripheral utility devices, each peripheral utility device coupled to a telephone of the plurality of telephones, said telephone system further comprising a privacy means comprising:

means for activating a privacy feature to inhibit all but a designated telephone of the plurality of telephones from connecting to a call on the telephone line; and each of said plurality of peripheral utility devices further comprising;
means for detecting an activated privacy feature; and
means for preventing the plurality of telephones other than the designated telephone from connecting to the telephone line.

27. In a telephone system coupled to a telephone line for receipt and transmission of telephone calls, said telephone system receiving a high voltage ringing signal indicative of an incoming telephone call, said system comprising at least one telephone comprising a handset and a receiver, said telephone coupled through an interface device to the telephone line, a method for providing an automated call screening process of an answered incoming telephone cab for limiting access to the telephone system to authorized callers authorized to contact a called party, said method comprising the steps of:

preventing the high voltage ringing signal generated by the incoming telephone call from reaching the telephone;

automatically answering the incoming telephone call;

prompting a caller of the answered incoming telephone call to input a telephone number input by the caller;

deriving a derived code from the telephone number of the caller;

comparing the derived code to at least one authorization code from a list of at least one authorization code;

issuing a low voltage DTMF ringing signal on the telephone line if the derived code matches the authorization code from the list of at least one authorization code, said low voltage DTMF ringing signal at a voltage lower than the high voltage ringing signal;

generating a ringing sound at the interface device to the telephone in response to the low voltage DTMF ringing signal issued to notify the called party that the answered incoming telephone call is an authorized incoming telephone call;

transferring the authorized incoming telephone call across the telephone line to the telephone when the handset is picked up by the called party to answer the authorized incoming telephone call;

wherein the called party is only notified of the incoming telephone call if the caller is authorized to contact the called party.

* * * * *